No. 699,692. Patented May 13, 1902.
C. C. LONGARD.
WRENCH.
(Application filed Sept. 21, 1901.)
(No Model.)
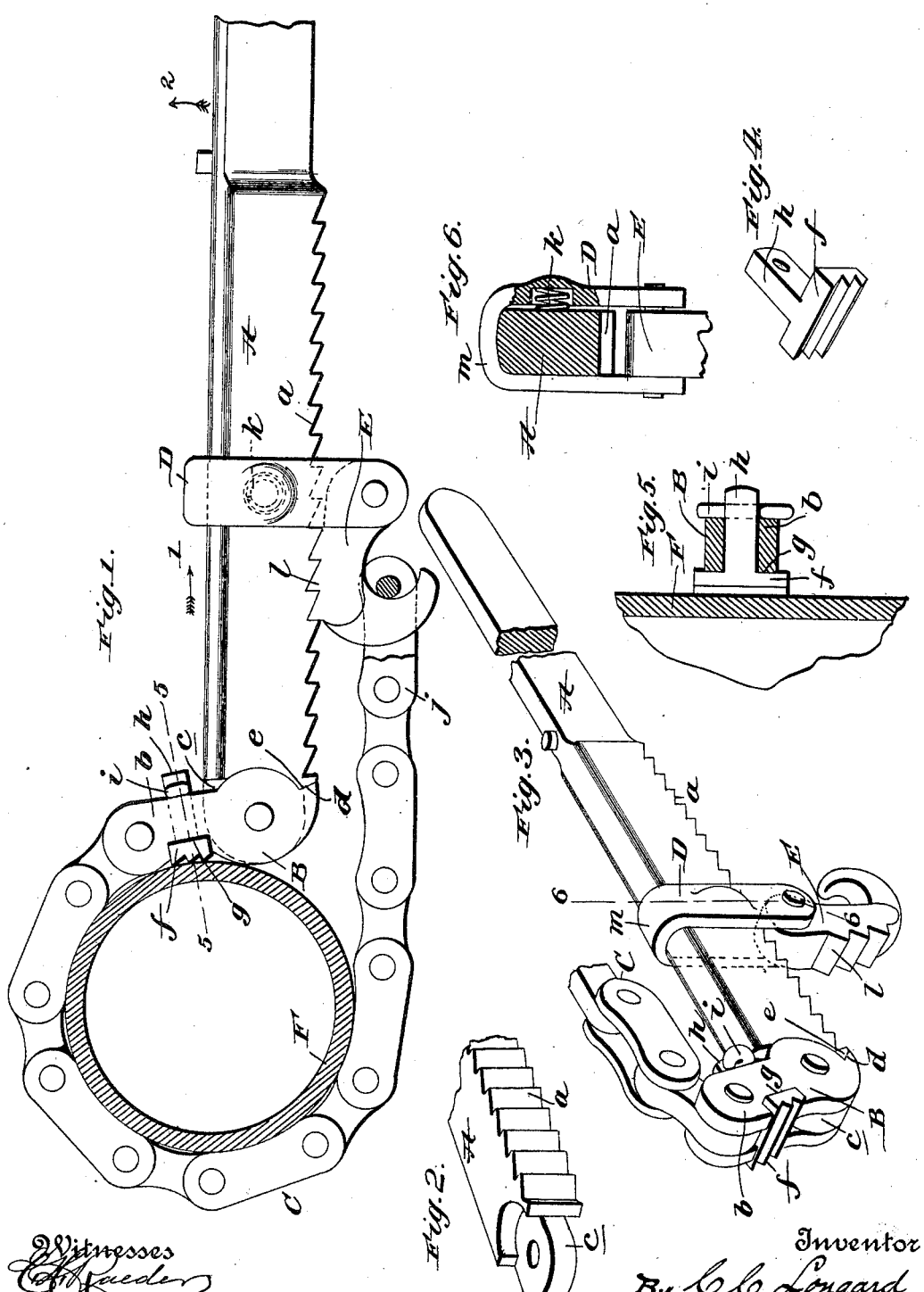

UNITED STATES PATENT OFFICE.

CLARENCE C. LONGARD, OF HALIFAX, CANADA.

WRENCH.

SPECIFICATION forming part of Letters Patent No. 699,692, dated May 13, 1902.

Application filed September 21, 1901. Serial No. 76,093. (No model.)

*To all whom it may concern:*

Be it known that I, CLARENCE C. LONGARD, a citizen of Canada, residing at Halifax, in the Province of Nova Scotia and Dominion of Canada, have invented new and useful Improvements in Wrenches, of which the following is a specification.

My invention relates to an improved pipe-wrench, the novelty, utility, and advantages of which will be fully understood from the following description and claims when taken in conjunction with the accompanying drawings, in which—

Figure 1 is a view showing my improved wrench in side elevation with its pipe-engaging members in their proper operative positions. Fig. 2 is a detail perspective view of the forward end of the wrench-handle. Fig. 3 is a broken perspective view illustrating the wrench-handle, the slide, the pipe-engaging member on the handle, and a portion of the chain constituting the other pipe-engaging member. Fig. 4 is a perspective view of the dog removed. Fig. 5 is a section taken in the plane of the line 5 5 of Fig. 1 and illustrating the dog in plan, and Fig. 6 is a broken transverse section taken in the plane indicated by the line 6 6 of Fig. 3.

Similar letters of reference designate corresponding parts in all of the views of the drawings, referring to which—

A is the wrench-handle, having teeth $a$ at one side or edge, B a pipe-engaging member thereon, and C another pipe-engaging member.

The member B may be of any suitable construction, although I prefer the construction shown, which comprises links $b$, pivotally connected to the forward reduced end $c$ of the handle and provided with toes $d$, arranged to abut against shoulders $e$ of the handle, and a toothed dog $f$, which is seated in notches $g$ in the forward edges of the links and is provided with a shank $h$, extending between the links and secured thereto by suitable means, such as a cotter-pin $i$. This manner of holding the dog in the links is advantageous, because the dog in operation is backed and reinforced by the walls of the notches, and when wear of the dog or notch-walls takes place the dog is prevented from dropping out of its seat and rendering the wrench useless, and it is also advantageous because of the facility with which the dog may be removed and replaced by a new dog when necessity demands. The pipe-engaging member C also may be of any suitable construction without departing from the scope of my invention. I prefer, however, that it should be in the form of a chain or band, as shown, connected at one end to the member B and having at its other end a connection $j$, such as a link, for the engagement of a detent, presently described.

D is a slide, which is mounted on the handle and extends beyond the toothed side thereof, and is provided, preferably at one side, with a spring $k$, which by bearing against the handle prevents a too free movement of the slide thereon, and E is a detent arranged between and pivotally connected to and extending forwardly from the extended sides of the slide and having the forward portion of its side adjacent to the side of the handle bearing the teeth $a$ provided with complementary teeth $l$ and also having a hook $l'$ on its forward portion.

In the practical operation of my improved wrench after the chain C is passed around the pipe F and the link $j$ placed in engagement with the hook $l'$ of detent E the operator, grasping the slide D, moves the same in the direction indicated by arrow 1 in Fig. 1 on the handle, and thereby draws the chain snug about the pipe. When the slide D is moved, as stated, the detent E by reason of its pivotal connection to the slide will ride freely over the teeth of the handle and will not in any way interfere with or render such movement difficult. When, however, the handle is moved in the direction indicated by arrow 2 in Fig. 1 to grip the pipe between the engaging members B and C and cause it to turn, the toothed side of the detent E will be drawn into engagement with the teeth of the handle after the manner shown in said figure, the handle will be snugly held between said toothed side of the hook and the transverse portion $m$ of the slide, and the slide will be held against rocking on the handle, with the result that slipping of the detent or slide so long as force is applied to the handle in the direction stated will be precluded. Again, it will be observed that when the operator moves the handle in the direction opposite to that indicated by arrow 2 to take a fresh hold on the pipe the chain C by following the member B around the pipe will tend to hold the detent E and slide D in the position shown in Fig. 1 and against slipping, and it will further be observed that my improved wrench is particularly adapted for overhead work, which necessitates the workman standing on a ladder or scaffold, since there is no danger of the chain becoming casually disengaged from the hook $l'$ of the detent E incident to the manipulation of the wrench and precipitating the workman to the floor.

Having described my invention, what I claim, and desire to secure by Letters Patent, is—

1. A pipe-wrench comprising a handle toothed at one edge, a pipe-engaging member at one end of said handle, a slide mounted on the handle, a detent pivotally connected to the slide and having a toothed edge or side on its forward portion arranged to engage the toothed edge of the handle and also having a hook on said forward portion, and a second pipe-engaging member suitably connected with the handle and having a connection adapted to be placed in engagement with the hook of the detent on the slide.

2. A pipe-wrench comprising a handle toothed at one edge, a pipe-engaging member at one end of said handle, a slide mounted on the handle and extended beyond the toothed edge thereof, and having the transverse portion arranged to engage the edge of the handle opposite to the toothed edge, a detent pivotally connected to the extended portion of the slide and extending forwardly therefrom, and having the side of its forward portion adjacent to the toothed edge of the handle toothed and also having a hook on said forward portion, and a second pipe-engaging member suitably connected with the handle and having a connection removably engaged with the hook of the detent on the slide.

3. A pipe-wrench comprising a handle toothed at one edge, a pipe-engaging member pivotally connected to one end of said handle, a slide mounted on the handle and extended beyond the toothed edge thereof and having the transverse portion arranged to engage the edge of the handle opposite to the toothed edge, a detent pivotally connected to the extended portion of the slide and extending forwardly therefrom and having the side of its forward portion adjacent to the toothed edge of the handle toothed and also having a hook on said forward portion, and a chain constituting a second pipe-engaging member, connected at one end to the first-named pipe-engaging member, and provided at its opposite end with a connection adapted to be placed in engagement with and disengaged from the hook of the detent on the slide.

4. A pipe-wrench comprising a handle toothed at one edge, and having its forward end reduced, links pivotally connected to said reduced end and having portions arranged to abut against shoulders of the handle, and also having notches in their forward edges, a toothed dog seated in said notches of the links and having a shank extending between the links, means for securing the shank in the links, a slide mounted on the handle, a hook pivotally connected to the slide and having a toothed edge or side arranged to engage that of the handle, and a chain connected to the links on the handle, and having a connection adapted to be engaged with the hook on the slide.

5. In a pipe-wrench, the combination of parallel links having notches in their edges, a toothed dog seated in said notches and having a shank extending between the links, and means at the back of the links engaging the shank and securing the dog in its seat in the links.

In testimony whereof I have hereunto set my hand in presence of two subscribing witnesses.

CLARENCE C. LONGARD.

Witnesses:
  C. PAETZOLD,
  ARTHUR WOODBURY.